(12) United States Patent
Naslavsky et al.

(10) Patent No.: US 12,154,054 B2
(45) Date of Patent: Nov. 26, 2024

(54) SYSTEM AND METHOD FOR MARITIME VESSEL RISK ASSESSMENT IN RESPONSE TO MARITIME VISUAL EVENTS

(71) Applicant: ShipIn Systems Inc., Newton, MA (US)

(72) Inventors: Ilan Naslavsky, Newton, MA (US); Moran Cohen, Jerusalem (IL); Osher Perry, Newton, MA (US); David J. Michael, Waban, MA (US)

(73) Assignee: ShipIn Systems Inc., Newton, MA (US)

( * ) Notice: Subject to any disclaimer, the term of this patent is extended or adjusted under 35 U.S.C. 154(b) by 0 days.

(21) Appl. No.: 17/973,675

(22) Filed: Oct. 26, 2022

(65) Prior Publication Data

US 2024/0144133 A1 May 2, 2024

(51) Int. Cl.
*G06Q 10/0635* (2023.01)
*G06Q 50/26* (2024.01)
*G06Q 50/40* (2024.01)

(52) U.S. Cl.
CPC ....... *G06Q 10/0635* (2013.01); *G06Q 50/265* (2013.01); *G06Q 50/40* (2024.01)

(58) Field of Classification Search
CPC .... G06V 10/96; G16H 40/63; G06K 9/00718; G06Q 10/083; G06Q 40/08;
(Continued)

(56) References Cited

U.S. PATENT DOCUMENTS 9,106,810 B1 8/2015 Hadsall, Sr.
9,996,749 B2 6/2018 Bataller
(Continued)

FOREIGN PATENT DOCUMENTS

CN 109819393 A 5/2019
CN 110363463 A 10/2019
(Continued)

OTHER PUBLICATIONS

Bloomfield, Nathaniel J., et al. "Automating the assessment of biofouling in images using expert agreement as a gold standard." Scientific Reports 11.1 (2021): 2739 [online], [retrieved on May 18, 2023]. Retrieved from the Internet <https://arxiv.org/pdf/2008.09289.pdf> (Year: 2021).*

(Continued)

*Primary Examiner* — Jerry O'Connor
*Assistant Examiner* — Michael R Koester
(74) *Attorney, Agent, or Firm* — Loginov & Associates, PLLC; William A. Loginov

(57) ABSTRACT

A system and method assessing maritime vessel risk in response to automatically detected maritime visual events is provided. At least one maritime visual event is detected by at least one camera aboard a vessel that provides image data of the visual event to a processor. The visual event can be associated with at least one of, safety, security, maintenance, crew behavior, and cargo. A risk assessment score is produced in response to the detected visual event, and that risk assessment score is provided to a user in a desired format. Production of the risk assessment score can entail comparing the visual event to data of complying or non-complying model visual events from a data storage. Risk assessment scores can be aggregated from plurality of events and/or a fleet of vessels to generate overall scores for the vessel and fleet.

21 Claims, 10 Drawing Sheets

(58) Field of Classification Search
CPC ............... G06Q 10/0635; G06Q 10/06; G01C 21/3461; B63B 43/18
See application file for complete search history.

(56) References Cited

U.S. PATENT DOCUMENTS

| | | | |
|---|---|---|---|
| 10,936,907 | B2 | 3/2021 | Suresh |
| 11,132,552 | B1 | 9/2021 | Naslavsky |
| 2002/0075546 | A1 | 6/2002 | Webb |
| 2003/0025599 | A1 | 2/2003 | Monroe |
| 2004/0008253 | A1 | 1/2004 | Monroe |
| 2005/0055330 | A1 | 3/2005 | Britton |
| 2007/0260363 | A1 | 11/2007 | Miller |
| 2009/0102950 | A1 | 4/2009 | Ahiska |
| 2011/0257819 | A1 | 10/2011 | Chen |
| 2014/0059468 | A1 | 2/2014 | Allgair |
| 2017/0140603 | A1 | 5/2017 | Ricci |
| 2018/0239948 | A1 | 8/2018 | Rutschman |
| 2018/0239982 | A1 | 8/2018 | Rutschman |
| 2018/0356231 | A1 | 12/2018 | Steffens |
| 2020/0012283 | A1 | 1/2020 | Nguyen |
| 2020/0064466 | A1 | 2/2020 | Harper |
| 2020/0184828 | A1 | 6/2020 | Mazor |
| 2020/0264268 | A1 | 8/2020 | Moore |
| 2020/0327345 | A1 | 10/2020 | Schumacher |
| 2021/0174952 | A1* | 6/2021 | Leong ................... G16H 50/20 |
| 2022/0144392 | A1 | 5/2022 | Raviv |
| 2022/0253763 | A1* | 8/2022 | Dividino ............ G06Q 10/0635 |
| 2022/0261483 | A1* | 8/2022 | Tam ................... H04L 63/1433 |
| 2022/0396340 | A1 | 12/2022 | Delfs |

FOREIGN PATENT DOCUMENTS

| | | | |
|---|---|---|---|
| CN | 210464459 | 5/2020 | |
| GB | 2609530 A | * 2/2023 | ............ G01J 5/0025 |
| KR | 20130137876 | * 12/2013 | ............ H04N 7/18 |
| KR | 101993138 | 6/2019 | |
| KR | 20210019862 A | * 2/2021 | |
| KR | 102320142 B1 | 11/2021 | |
| KR | 1020220062162 | 5/2022 | |
| WO | 2022269609 | 12/2022 | |

OTHER PUBLICATIONS

Ilan Naslavsky, U.S. Appl. No. 17/873,053, entitled System and Method for Automatic Detection of Visual Events in Transportation Environments, filed Jul. 25, 2022.
Survey of Cutting-edge Computer Vision Papers—Human Recognition, Hiroto Honda, May 15, 2019, https://engineering.dena.com/blog/2019/05/survey-of-cutting-edge-computer-vision-papers-human-recognition/.
Qiao Dalei et al. "Marine Vision-Based Situational Awareness Using Discriminative Deep Learning: A Survey", Journal of Marine Science and Engineering, vol. 9, No. 4, Apr. 8, 2021, pp. 1-18, XP055929236, DOI: 10.3390/jmse9040397 abstract.
Shanshan Zhou et al. "Deep Optical Flow Estimation Via Multi-Scale Correspondence Structure Learning", Arxiv.org, Cornell University Library, 201 Olin Library Cornell University Ithaca, NY 14853, Jul. 23, 2017, XP080778867, DOI : 10.24963/IJCAI.2017/488, abstract; figure 2.
Translated Version of CN210464459 (Year: 2020).

* cited by examiner

SYSTEM AND METHOD FOR MARITIME VESSEL RISK ASSESSMENT IN RESPONSE TO MARITIME VISUAL EVENTS This application relates to systems and methods for detecting and communicating visual data and related events in a transportation environment.

BACKGROUND OF THE INVENTION

International shipping is a critical part of the world economy. Ocean-going, merchant freight vessels are employed to carry virtually all goods and materials between ports and nations. The current approach to goods shipments employs intermodal cargo containers, which are loaded and unloaded from the deck of ships, and are carried in a stacked configuration. Freight is also shipped in bulk carriers (e.g. grain) or liquid tankers (e.g. oil). The operation of merchant vessels can be hazardous and safety concerns are always present. Likewise, passenger vessels, with the precious human cargo are equally, if not more, concerned with safety of operations and adherences to rules and regulations by crew and passengers. Knowledge of the current status of the vessel, crew and cargo can be highly useful in ensuring safe and efficient operation.

Commonly assigned, U.S. patent application Ser. No. 17/175,364, entitled SYSTEM AND METHOD FOR BANDWIDTH REDUCTION AND COMMUNICATION OF VISUAL EVENTS, filed Feb. 12, 2021, by Ilan Naslavsky, et al, teaches a system and method that addresses problems of bandwidth limitations in certain remote transportation environments, such as ships at sea, and is incorporated herein by reference as useful background information. According to this system and method, while it is desirable in many areas of commercial and/or government activity to enable visual monitoring (manual and automated surveillance), with visual and other status sensors to ensure safe and rule-conforming operation, these approaches entail the generation and transmission of large volumes of data to a local or remote location, where such data is stored and/or analyzed by management personnel. Unlike most land-based (i.e. wired, fiber or high-bandwidth wireless) communication links, it is often much more challenging to transmit useful data (e.g. visual information) from ship-to-shore. The incorporated U.S. application teaches a system and method that enables continuous visibility into the shipboard activities, shipboard behavior, and shipboard status of an at-sea commercial merchant vessel (cargo, fishing, industrial, and passenger). It allows the transmitted visual data and associated status be accessible via an interface that aids users in manipulating, organizing and acting upon such information.

The ability to assign risk values/levels to events can help to prioritize their seriousness and can be useful in various cost-management activities, such as those related to insurance risk mitigation that can help to lower rates charged to vessel owners and operators. In the past, manual paper surveys were used to collect information about the vessel and its operations. The results of these manual paper surveys were used to build risk assessments for (e.g.) insurance. In addition, highly skilled surveyors and inspectors were dispatched (for example, spending at least 8 hours per year per vessel) to conduct these surveys. Given the automatic detection of events is contemplated by the above-incorporated application, it is desirable to determine, in an automated manner that is based upon such events, particular risks aboard a commercial vessel through reaction(s) to such automatically detected maritime visual events onboard a commercial vessel.

SUMMARY OF THE INVENTION

This invention overcomes disadvantages of the prior art by providing automated, real time, near-real time, and subsequent, visual evidence-based reporting and assessment of risk in operation of a maritime vessel, and automated support for risk assessments made using other conventional techniques, including human/manual inspection of vessels. Hence, a system and method automatically assessing maritime vessel risk in response to automatically detected maritime visual events can include detection of at least one maritime visual event by at least one camera aboard a vessel that provides image data of the visual event to a processor. The visual event can be associated with at least one of, safety, security, maintenance, crew behavior, and cargo. These visual events are associated with broader categories such as ship's hull and machinery, cargo, and personnel. A risk assessment score is produced in response to the detected visual event optionally in a broader category, and that risk assessment score is provided to a user in a desired format. Production of the risk assessment score can entail comparing the visual event to data of complying or non-complying model visual events from a data storage. Risk assessment scores can be aggregated from plurality of events and/or a fleet of vessels to generate overall scores for the vessel and fleet.

In an illustrative embodiment, a system and method for assessing maritime vessel risk in response to automatically detected maritime-based visual events is provided. The system and method detects at least one maritime visual event of the plurality of maritime based visual events acquired by at least one camera aboard a vessel that provides image data of the visual event to a processor. The visual event is associated with at least one of, safety, security, maintenance, crew behavior, and cargo. A risk assessment score is produced in response to the at least one detected visual event. This risk assessment score can be provided to a user in a desired format. Illustratively, the risk assessment score can be produced by comparing the at least one visual event to data of complying or non-complying model visual events from a data storage, and establishing a score based upon a level of conformity between the at least one visual event and the complying or non-complying model visual events. The comparison can be based on a variety of processes, including neural network and/or deep learning processes operating on a computer processor. The risks in the assessment can relate to including at least one of (a) machinery maintenance alerts, (b) cargo conditions or operations, and (c) personnel safety, security and crew behavior (an/or other areas, such as those related to hull and machinery). The production of the risk assessment score can include comparing the at least one visual event to a minimum standard that is associated with at least one of (a) a type of vessel or fleet of vessels, (b) cargo handling standards, and (c) safety standards (among other standards clear to those of skill). Alternatively, or additionally, the production of the risk assessment score can include comparing the at least one visual event to a relative standard that is associated with at least one of (a) a type of vessel or fleet of vessels, (b) cargo handling standards, and (c) safety standards (among other standards clear to those of skill). The relative standard can be based upon a predetermined number of standard deviation(s) from a mean value. Additional information can be provided by the system and method to the user in association with the risk assessment score consistent with that provided in a vessel risk survey. A plurality of maritime-based visual events can be acquired by cameras aboard each of a plurality vessels in a fleet that each provide image data of the plurality of visual events. The plurality of visual events can be associated with at least one of, safety, security, maintenance, crew behavior, and cargo, and be used to produce risk assessment scores in response to the detected visual events. The system and method then correlates the risk assessment scores into an overall risk assessment of the fleet. The risk assessment can be organized into at least one of safety, security, maintenance, crew behavior, and cargo and is displayed on a user interface. Additionally, the profile of the risk assessment for an individual vessel in the fleet can be displayed on the user interface based upon a user selection of that particular vessel from a menu.

BRIEF DESCRIPTION OF THE DRAWINGS

The invention description below refers to the accompanying drawings, of which.

DETAILED DESCRIPTION

I. System Overview

Figure 1:
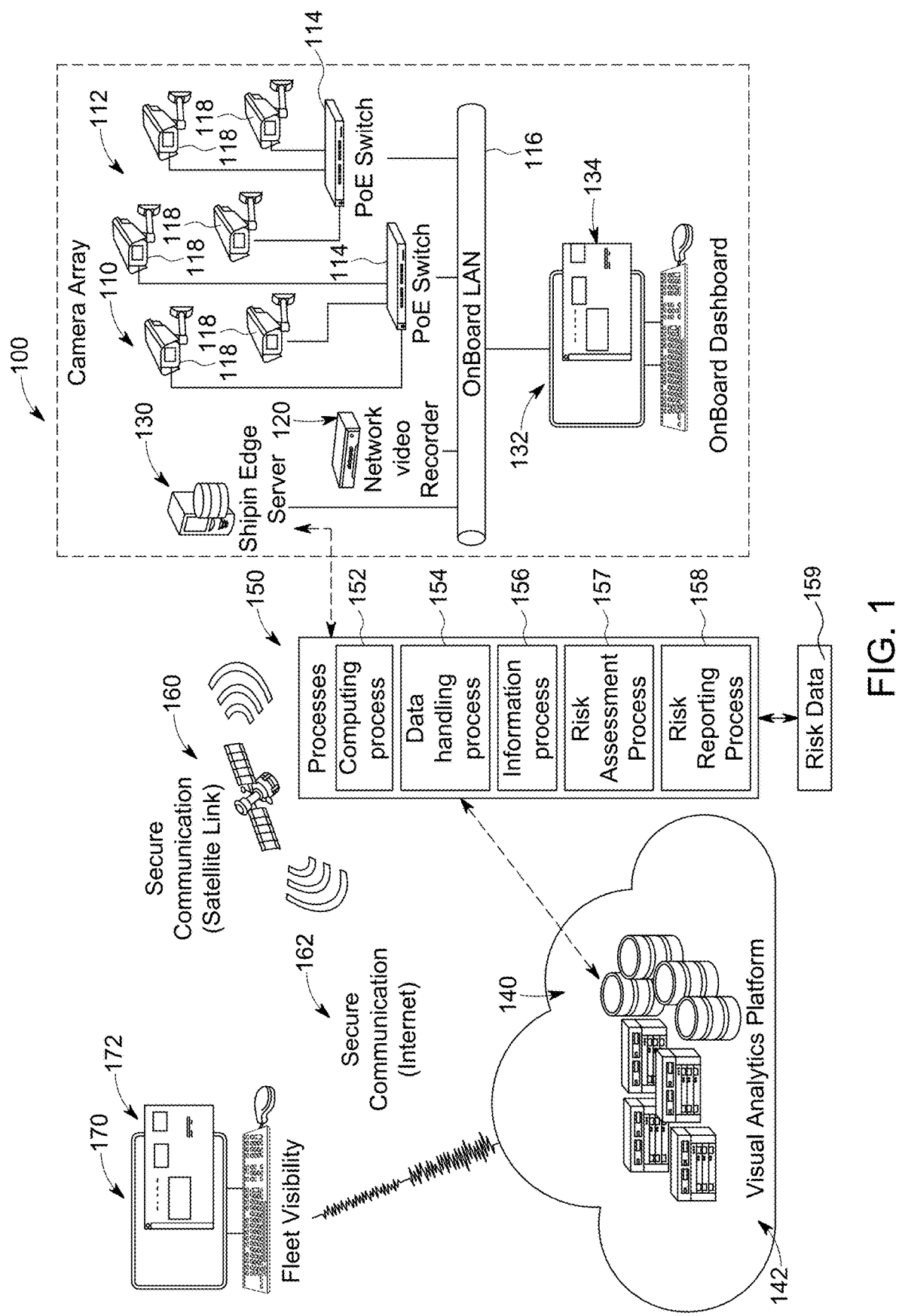
FIG. 1 is a diagram showing an overview of a system and associated method for acquiring, transmitting analyzing and reporting visual and other sensor information with respect to a communication link according to an illustrative embodiment.
Figure 1A:
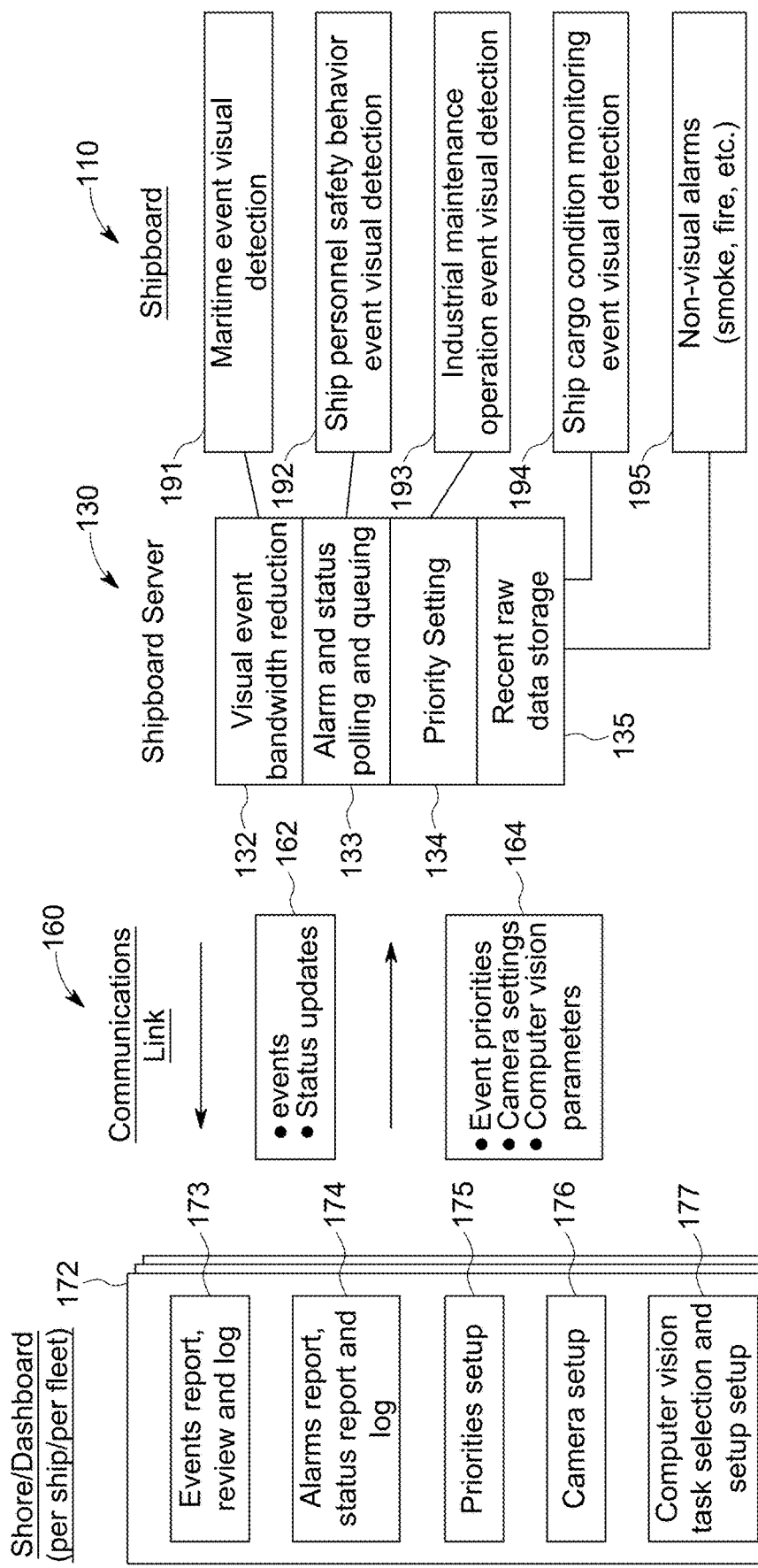
FIG. 1A is a block diagram showing data and operations employed by the system and method of FIG. 1.

FIGS. 1 and 1A show an arrangement 100 for tracking and reporting upon visual, and other, events generated by visual sensors aboard ship that create video data streams, visual detection of events aboard ship based on those video data streams, aggregation of those visual detections aboard ship, prioritization and queuing of the aggregated detections into events, optional bandwidth reduction of the video data streams in combination with the aggregated events, sending the events over the reduced bandwidth communications channel to shore, reporting the events to a user-interface on shore, and further aggregation of the events from multiple ships and multiple time periods into a fleet-wide aggregation that can present information over time. The system and method herein further provides the ability to configure and setup the system described above to select or not select events for presentation in order to reduce confusion for the person viewing the dashboard as well as to set the priority for communicating particular events or classes of events. Such communication can optionally occur over the reduced bandwidth communications channel so that the most important events are communicated at the expense of less important events.

FIG. 1, the arrangement 100 particularly depicts a shipboard location 110 includes a camera (visual sensor) array 112 comprising a plurality of discrete cameras 118 (and/or other appropriate environmental/event-driven sensors) that are connected to wired and/or wireless communication links (e.g. that are part of a TCP/IP LAN or other protocol-driven data transmission network 116) via one or more switches, routers, etc. 114. Image (and other) data from the (camera) sensors 118 is transmitted via the network 116. Note that cameras can provide analog or other format image data to a remote receiver that generates digitized data packets for use of the network 116. The cameras 118 can comprise conventional machine vision cameras or sensors operating to collect raw video or digital image data, which can be based upon two-dimensional (2D) and/or three-dimensional (3D) imaging. Furthermore, the image information can be grayscale (monochrome), color, and/or near-visible (e.g. infrared (IR)). Likewise, other forms of event-based cameras can be employed.

Note that data used herein can include both direct feeds from appropriate sensors and also data feeds from other data sources that can aggregate various information, telemetry, etc. For example, location and/or directional information can be obtained from navigation systems (GPS etc.) or other systems (e.g. via APIs) through associated data processing devices (e.g. computers) that are networked with a server 130 for the system. Similarly, crew members can input information via an appropriate user interface. The interface can request specific inputs—for example logging into or out of a shift, providing health information, etc.—or the interface can search for information that is otherwise input by crew during their normal operations—for example, determining when a crew member is entering data in the normal course of shipboard operations to ensure proper procedures are being attended to in a timely manner.

The shipboard location 110 can further include a local image/other data recorder 120. The recorder can be a standalone unit, or part of a broader computer server arrangement 130 with appropriate processor(s), data storage and network interfaces. The server 130 can perform generalized shipboard, or dedicated, to operations of the system and method herein with appropriate software. The server 130 communicates with a work station or other computing device 132 that can include an appropriate display (e.g. a touchscreen) 134 and other components that provide a graphical user interface (GUI). The GUI provides a user on board the vessel with a local dashboard for viewing and controlling manipulation of event data generated by the sensors 118 as described further below. Note that display and manipulation of data can include, but is not limited to enrichment of the displayed data (e.g. images, video, etc.) with labels, comments, flags, highlights, and the like.

The information handled and/or displayed by the interface can include a workflow provided between one or more users or vessels. Such a workflow would be a business process where information is transferred from user to user (at shore or at sea interacting with the application over the GUI) for action according to the business procedures/rules/policies. This workflow automation can be implemented in a variety of manners that include a computer and network arrangement, and in an embodiment, can be referred to as "robotic process automation."

The processes 150 that run the dashboard and other data-handling operations in the system and method can be performed in whole or in part with the onboard server 130, and/or using a remote computing (server) platform 140 that is part of a land-based, or other generally fixed, location with sufficient computing/bandwidth resources (a base location 142). The processes can generally include 150 a computation process 152 that handles sensor data to meaningful events. This can include machine vision algorithms and similar procedures. A data-handling process 154 can be used to derive events and associated status based upon the events—for example movements of the crew and equipment, cargo handling, etc. An information process 156 can be used to drive dashboards for one or more vessels and provide both status and manipulation of data for a user on the ship and at the base location.

Data is communicated between the ship (or other remote location) 110 and the base 142 occurs over one or more wireless channels, which can be facilitated by a satellite uplink/downlink 160, or another transmission modality—for example, long-wavelength, over-air transmission. Moreover, other forms of wireless communication can be employed such as mesh networks and/or underwater communication (for example long-range, sound-based communication and/or VLF). Note that when the ship is located near a land-based high-bandwidth channel or physically connected by-wire while at port, the system and method herein can be adapted to utilize that high-bandwidth channel to send all previously unsent low-priority events, alerts, and/or image-based information.

The (shore) base server environment 140 communicates via an appropriate, secure and/or encrypted link (e.g. a LAN or WAN (Internet)) 162 with a user workstation 170 that can comprise a computing device with an appropriate GUI arrangement, which defines a user dashboard 172 allowing for monitoring and manipulation of one or more vessels in a fleet over which the user is responsible and manages.

Figure 1B:
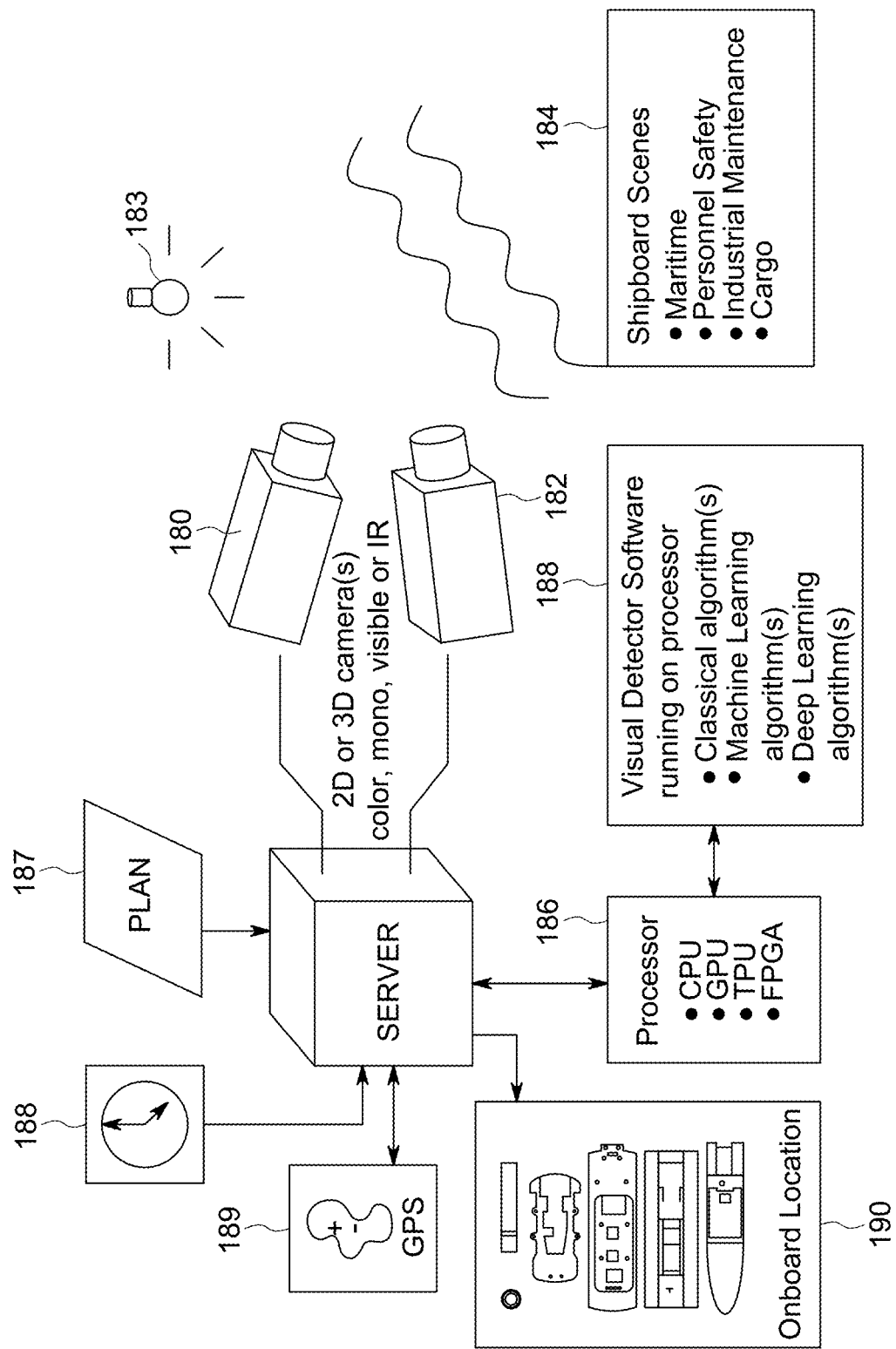
FIG. 1B is a diagram showing acquisition of images and other data for expected event detection according to the system and method of FIG. 1.

Referring further to FIG. 1A, the data handled by the system is shown in further detail. The data acquired aboard the vessel environment 110, and provided to the server 130 can include a plurality of possible, detected visual (and other sensor-based) events. These events can be generated by action of software and/or hardware based detectors that analyze visual images and/or time-sequences of images acquired by the cameras. With further reference to FIG. 1B, visual detection is facilitated by a plurality of 2D and/or 3D camera assemblies depicted as cameras 180 and 182 using ambient or secondary sources of illumination 183 (visible and/or IR). The camera assemblies image scenes 184 located on board (e.g.) a ship. The scenes can relate to, among other subjects, maritime events, hull and machinery, personnel safety and/or cargo. The images are directed as image data to the event detection server or processor 186 that also receives inputs from a plan or program 187 that characterizes events and event detection and a clock 188 that establishes a timeline and timestamp for received images. The event detection server or processor 186 can also receive inputs from a GPS receiver 189 to stamp the position of the ship at the time of the event and can also receive input from an architectural plan 190 of the vessel (that maps onboard locations on various decks) to stamp the position of the sensor within the vessel that sent the input. The event server/processor 186 can comprise one or more types and/or architectures of processor(s), including, but not limited to, a central processing unit (CPU—for example one or more processing cores and associated computation units), a graphical processing unit (GPU—operating on a SIMD or similar arrangement), tensor processing unit (TPU) and/or field programmable gate array (FPGA—having a generalized or customized architecture).

Referring again to FIG. 1A, the base location dashboard 172 is established on a per-ship and/or per fleet basis and communicates with the shipboard server 130 over the communications link 160 in a manner that is optionally reduced in bandwidth, and possibly intermittent in performing data transfer operations. The link 160 transmits events and status updates 162 from the shipboard server 130 to the dashboard 172 and event priorities, camera settings and vision system parameters 164 from the dashboard 172 to the shipboard server. More particularly, the dashboard displays and allows manipulation of events reports and logs 173, alarm reports and logs 174, priorities for events, etc. 175, camera setup 176 and vision system task selection and setup relevant to event detection, etc. 177. The shipboard server 130 includes various functional modules, including visual event bandwidth reduction 132 that facilitates transmission over the link 160; alarm and status polling and queuing 133 that determines when alarms or various status items have occurred and transmits them in the appropriate priority order; priority setting 134 that selects the priorities for reporting and transmission; and a data storage that maintains image and other associated data from a predetermined time period 135.

II. Visual Detectors

As shown in FIG. 1B, various imaged events are determined from acquired image data using appropriate processes/algorithms 188 performed by the processor(s) 186. These can include classical algorithms, which are part of a conventional vision system, such as those available from (e.g.) Keyence, Cognex Corporation, MVTec, or HIKVision. Alternatively, the classical vision system could be based on open source such as OpenCV. Such classical vision systems can include a variety of vision system tools, including, but not limited to, edge finders, blob analyzers, pattern recognition tools, etc. The processor(s) 186 can also employ machine learning algorithms or deep learning algorithms, which can be custom built or commercially available from a variety of sources, and employ appropriate deep-learning frameworks such as caffe, tensorflow, torch, keras and/or OpenCV. The network could be a mask R-CNN or Yolov3 detector. See also URL address http://engineer.dena.com/posts/2019.05/survey-of-cutting-edge-computer-vision-papers-human-recognition/ on the WorldWideWeb.

As shown in FIG. 1A, the visual detectors relate to maritime events 191, ship personnel safety behavior and events 192, hull and machinery maintenance operation and events 193, ship cargo condition and events related thereto 194, and/or non-visual alarms, such as smoke, fire, and/or toxic gas detection via appropriate sensors. By way of non-limiting example, some particular detected events and associated detectors relate to the following:

(a) A person is present at their station at the expected time and reports the station, start time, end time, and elapsed time;

(b) A person has entered a location at the expected time and reports the location, start time, end time, and elapsed time;

(c) A person moved through a location at the expected time and reports the location, start time, end time, and elapsed time;

(d) A person is performing an expected activity at the expected location at the expected time and reports the location, start time, end time, and elapsed time—the activity can include (e.g.) watching, monitoring, installing, hose-connecting or disconnecting, crane operating, tying with ropes;

(e) a person is running, slipping, tripping, falling, lying down, using or not using handrails at a location at the expected time and reports the location, start time, end time, and elapsed time;

(f) A person is wearing or not wearing protective equipment when performing an expected activity at the expected location at the expected time and reports the location, start time, end time, and elapsed time—protective equipment can include (e.g.) a hard-hat, left or right glove, left or right shoe/boot, ear protection, safety goggles, life-jacket, gas mask, welding mask, or other protection;

(g) A door is open or closed at a location at the expected time and reports the location, start time, end time, and elapsed time;

(h) An object is present at a location at the expected time and reports the location, start time, end time and elapsed time—the object can include (e.g.) a gangway, hose, tool, rope, crane, boiler, pump, connector, solid, liquid, small boat and/or other unknown item;

(i) That normal operating activities are being performed using at least one of engines, cylinders, hose, tool, rope, crane, boiler, and/or pump; and (j) That required maintenance activities are being performed on engines, cylinders, boilers, cranes, steering mechanisms, HVAC, electrical, pipes/plumbing, and/or other systems.

Note that the above-recited listing of examples (a j) are only some of a wide range of possible interactions that can for the basis of detectors according to illustrative embodiments herein. Those of skill should understand that other detectable events involving person-to-person, person-to-equipment or equipment-to-equipment interaction are expressly contemplated.

In operation, an expected event visual detector takes as input the detection result of one or more vision systems aboard the vessel. The result could be a detection, no detection, or an anomaly at the time of the expected event according to the plan. Multiple events or multiple detections can be combined into a higher-level single events. For example, maintenance procedures, cargo activities, or inspection rounds may result from combining multiple events or multiple detections. Note that each visual event is associated with a particular (or several) vision system camera(s) 118, 180, 182 at a particular time and the particular image or video sequence at a known location within the vessel. The associated video can be optionally sent or not sent with each event or alarm. When the video is sent with the event or alarm, it may be useful for later validation of the event or alarm. In addition to compacting the video by reducing it to a few images or short-time sequence, the system can reduce the images in size either by cropping the images down to significant or meaningful image locations required by the detector or by reducing the resolution say from the equivalent of high-definition (HD) resolution to standard-definition (SD) resolution, or below standard resolution.

The shipboard server establishes a priority of transmission for the processed visual events that is based upon settings provided from a user, typically operating the on-shore (base) dashboard. The shipboard server buffers these events in a queue in storage that can be ordered based upon the priority. Priority can be set based on a variety of factors—for example personnel safety and/or ship safety can have first priority and maintenance can have last priority, generally mapping to the urgency of such matters. By way of example, all events in the queue with highest priority are sent first. They are followed by events with lower priority. If a new event arrives shipboard with higher priority, then that new higher priority event will be sent ahead of lower priority events. It is contemplated that the lowest priority events can be dropped if higher priority events take all available bandwidth. The shipboard server receives acknowledgements from the base server on shore and confirms that events have been received and acknowledged on shore before marking the shipboard events as having been sent. Multiple events may be transmitted prior to receipt (or lack of receipt) of acknowledgement. Lack of acknowledgement potentially stalls the queue or requires retransmission of an event prior to transmitting all next events in the priority queue on the server. The shore-based server interface can configure or select the visual event detectors over the communications link. In addition to visual events, the system can transmit non-visual events like a fire alarm signal or smoke alarm signal.

III. Detection Flow

Figure 2:
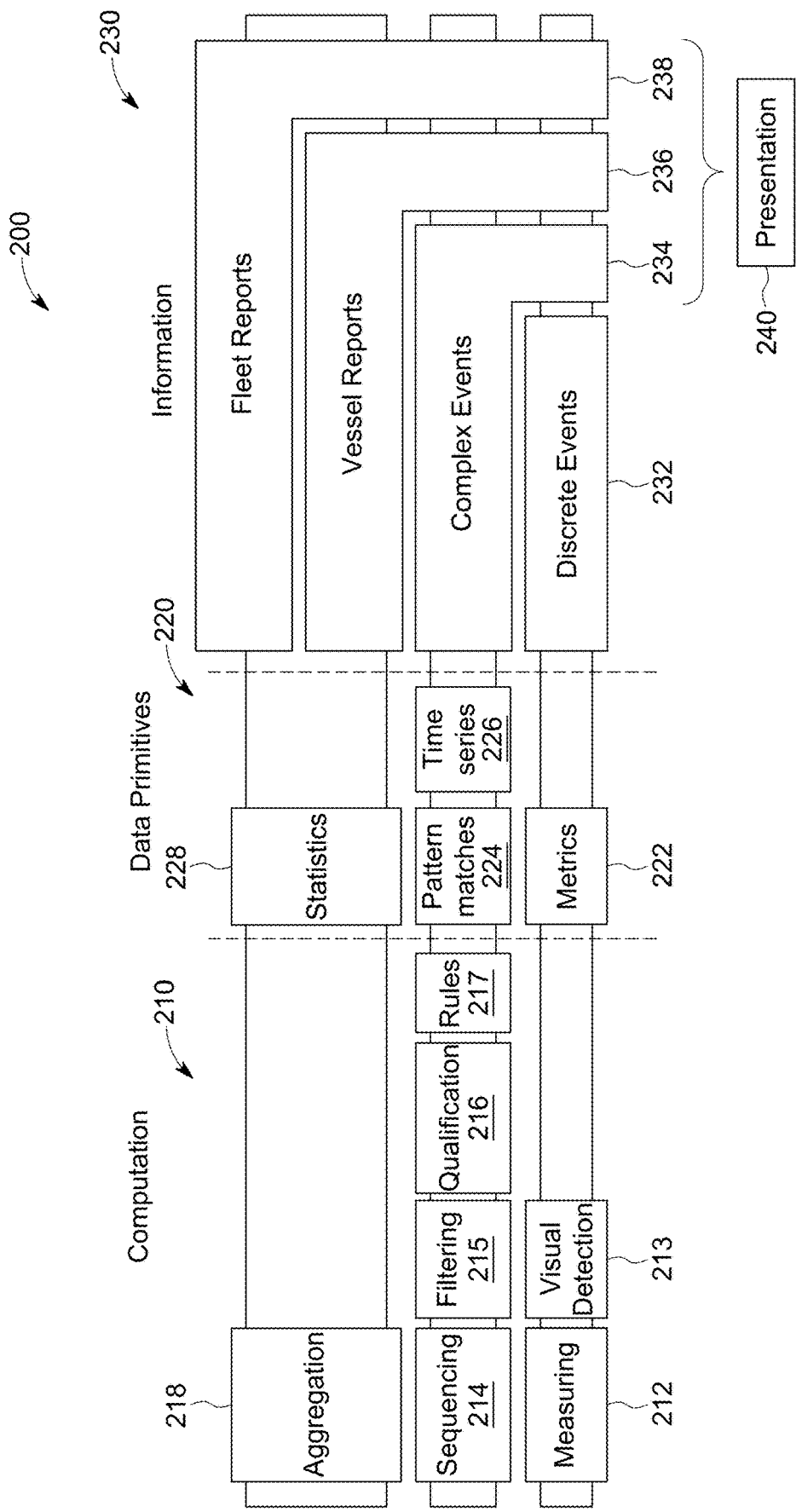
FIG. 2 is a flow diagram showing detection and reporting of visual events and associated data by the processors and processes of the system and method of FIG. 1.

As shown in FIG. 2, an exemplary operating procedure 200 for generalized detection flow used in performing the system is shown. The operation can be characterized in three phases or segments, computation 210, generation of data primitives 220 and information creation 230 and presentation 240 to users via the shore-based dashboard. Alternatively, some or all of the functions herein can be implemented by users via a ship-based dashboard, which affects programming on at least one of the local server or the base server. The shipboard dashboard can also act as a passive terminal that transmits instructions back to the base interface over the communications link so that such instructions can be acted upon through the base. The computation phase 210 comprises measurement 212 using sensors and performing visual detection 213. These generate a set of metrics 222 that are displayed to the user as discrete events 232. The computation phase 210 uses event sequencing (priority) 214, filtering (via cropping, compression, etc.), and qualification of events 216 based upon rules 217 to provide pattern matches 224 according to a time series of events 226. This data is presented as complex events 234. These complex events 234 can comprise a scenario, such as a maintenance task successfully performed, or the occurrence of a safety breach. The computation phase 210 can aggregate visual and other events 218 and derive statistics 228—for example the number of safety breaches over a time interval, etc. These statistics 228 can be presented to the shore-based user as individual vessel reports 236 and fleet reports 238 that provide valuable information to the user regarding behavior and performance at various factors related to the events in aggregate.

Figure 3:
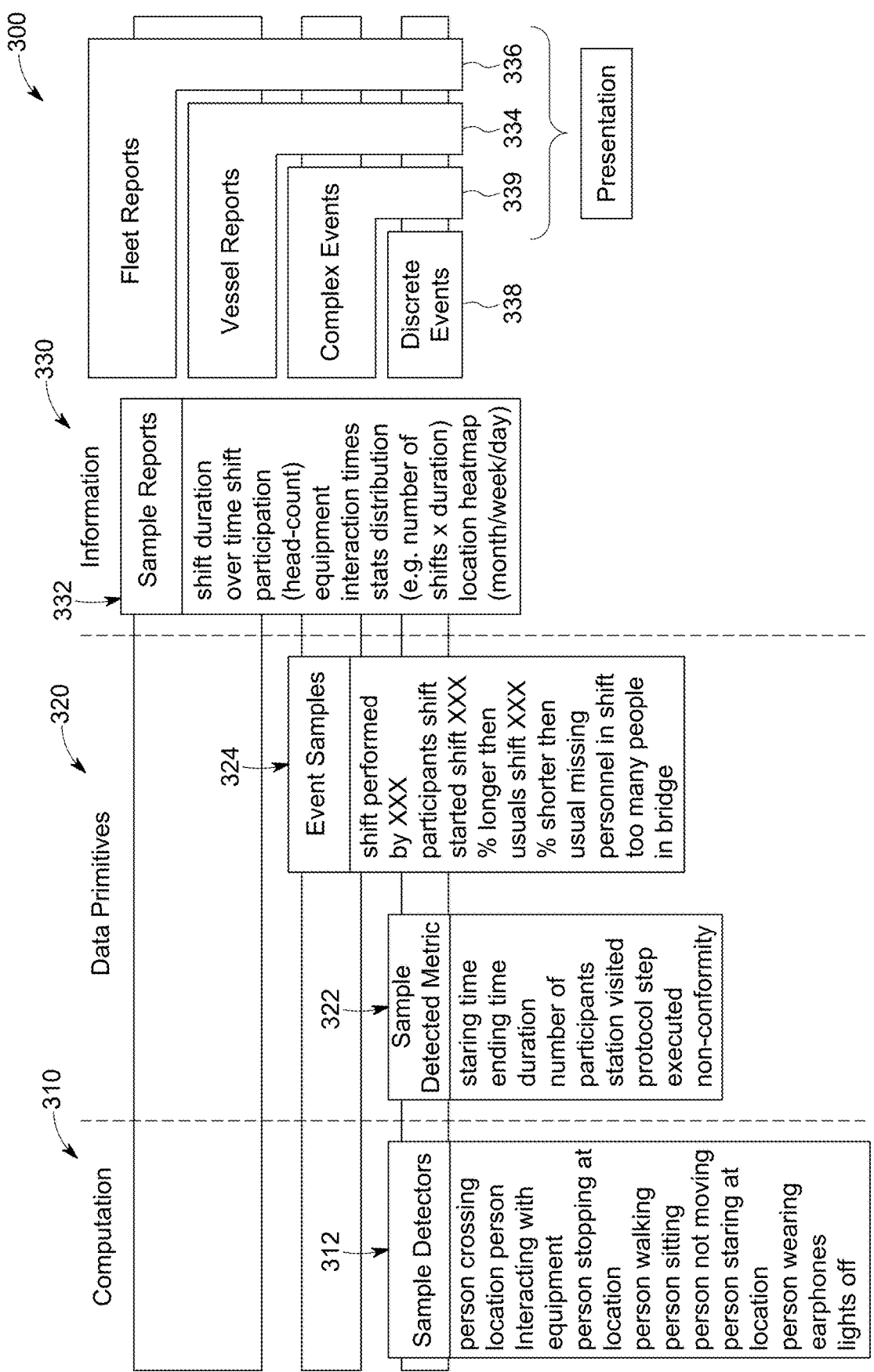
FIG. 3 is a flow diagram showing the detection of visual events using processors and processes of the system and method of FIG. 1 in the example of a bridge routine on a sea-going merchant vessel.

FIG. 3 shows a detection flow procedure 300 in the example of bridge routines for one or more vessels in a fleet. At the computation phase 310, the sample detectors 312 provided by visual and other detectors include (e.g.) a person crossing or stopping at a location, a person interacting with equipment, a person walking, sitting, not-moving (stationary), a person staring at a location, a person wearing earphones and/or lights off at the location. In the associated data primitives generation phase 320, sample detected metrics 322 are provided, including (e.g.) starting time and ending time, duration, number of participants, the bridge station visited, a protocol step executed and a non-conformity with protocols. Event samples 324 can include participant name(s) identified as performing the shift, when the shift started, whether a given participant's shift was longer or shorter than normal, missing personnel and/or excess/unauthorized personnel on the bridge. In the exemplary information phase sample reports 332 are created that can include (e.g.) shift duration over time, shift participation (head count), equipment interaction time statistics, distribution—for example number of shifts X duration and a location graph (e.g. a heatmap) that can be based upon month, week, day, etc. In the information phase 330, the sample reports 332 can be presented as vessel reports 334 and fleet reports. Sample detected metrics 322 and event samples 324 can be presented to the user as discrete events 338 and complex events 339.

Figure 4:
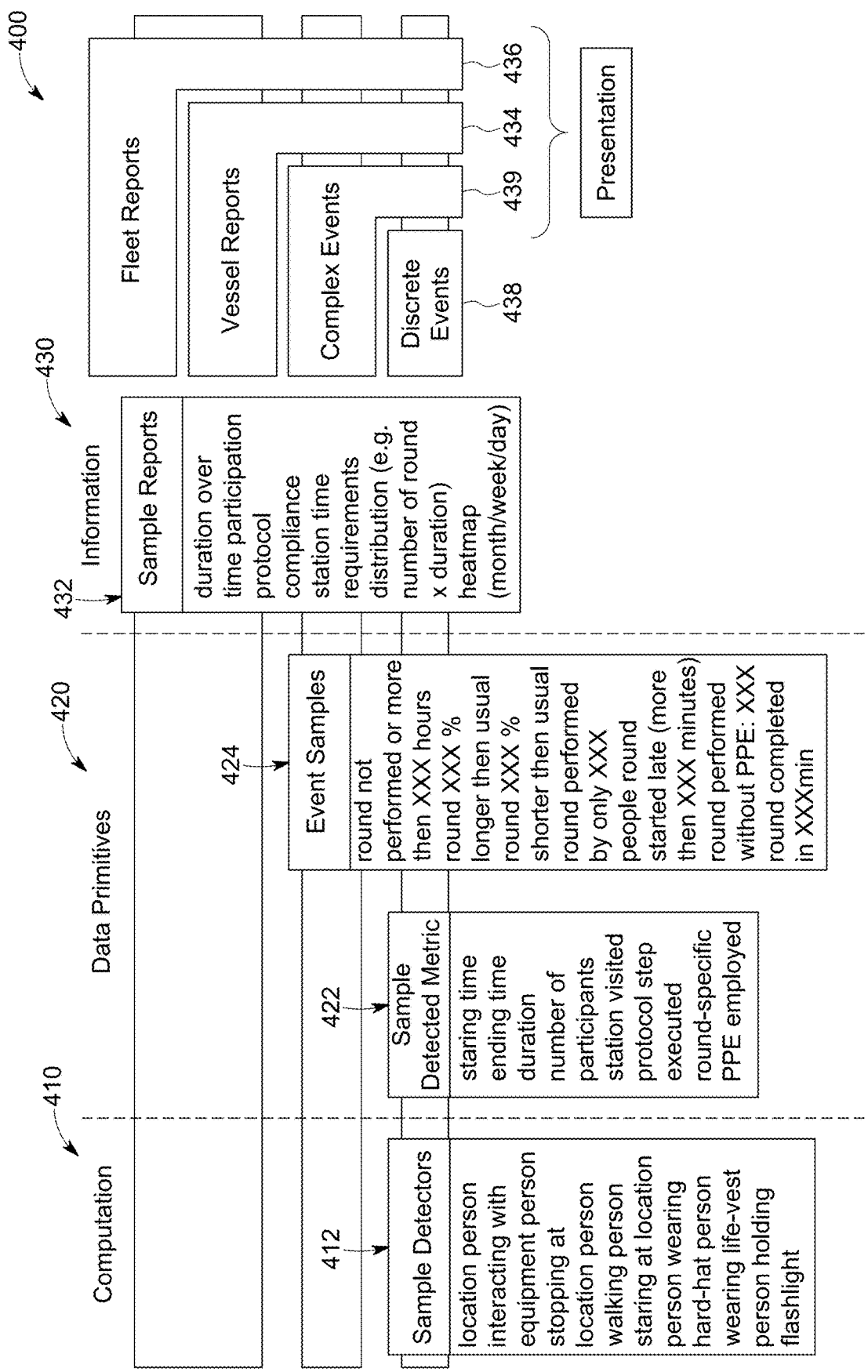
FIG. 4 is a flow diagram showing the detection of visual events using processors and processes of the system and method of FIG. 1 in the example of the performance of safety rounds by personnel (crew) on a sea-going merchant vessel.

FIG. 4 shows a detection flow procedure 400 in the example of safety rounds for one or more vessels in a fleet. At the computation phase 410, the sample detectors 412 provided by visual and other detectors include (e.g.) the location of the event, person interacting with equipment, person stopping at a location, person walking or staring at a location, person wearing a hard-hat, life vest or other protective equipment and/or holding a safety tool, such as a fire extinguisher, flashlight, etc. In the data primitives phase 420 sample detected metrics can include (e.g.) starting or ending time of an event, duration, number of participants, station visited protocol step executed and/or round-specific protective equipment (PPE) employed. Event samples 424 can include whether a safety round was not performed for a predetermined number of hours and a round taking X % more or less time than normal, a round performed by X number of personnel, a round started late by X minutes, a round performed without needed PPE and/or a round completed in X minutes. The information phase 432 provides sample reports 432, based upon events, including duration over time, participation, safety protocol compliance, station time requirements, distribution (e.g. number of rounds X duration) and/or a graph/heat map based upon month, day, week, etc. Vessel reports 434 and fleet reports 436. The information phase 430 also reports discrete events 438 and complex events 439 based upon sample detected events 422 and event samples 424.

Figure 5:
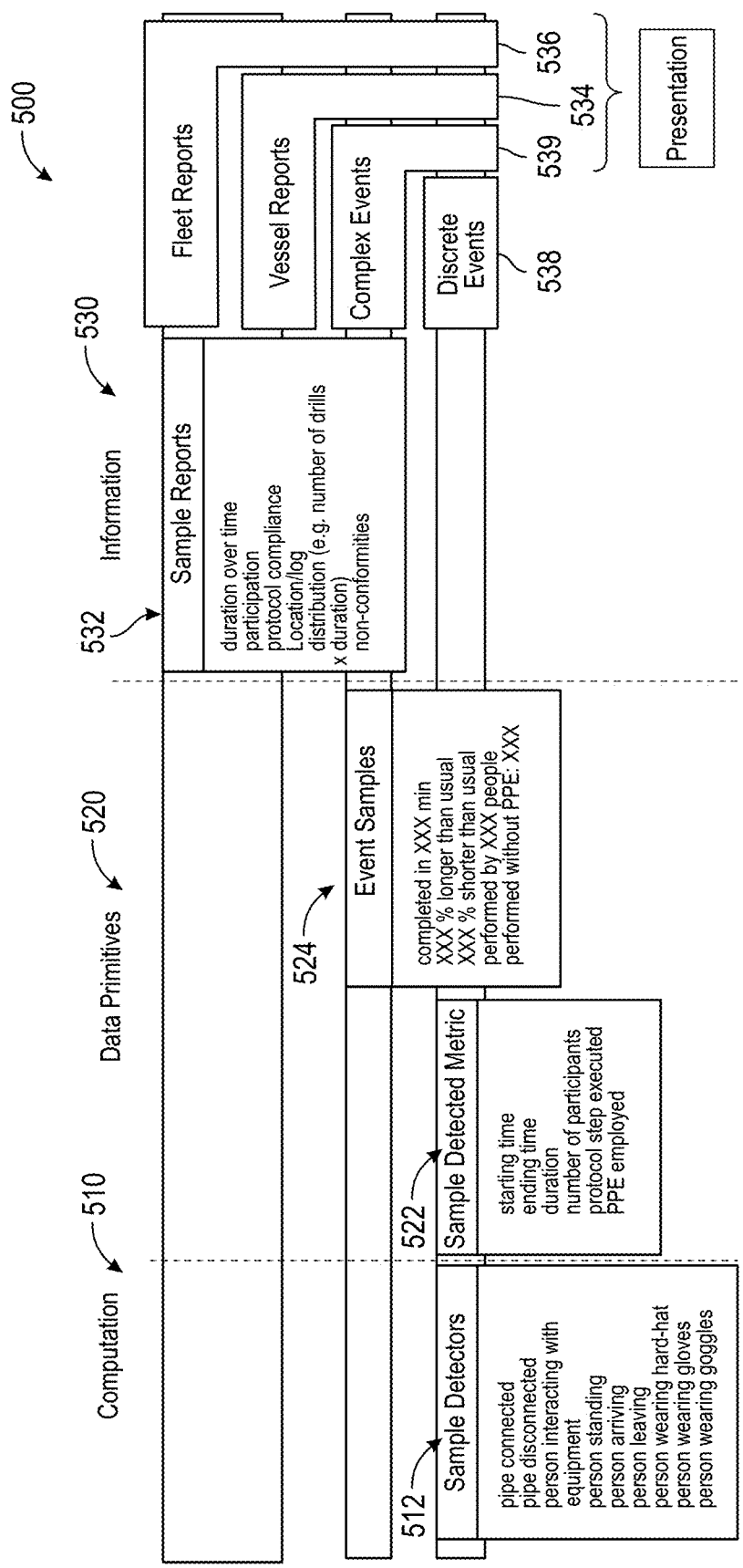
FIG. 5 is a flow diagram showing the detection of visual events using processors and processes of the system and method of FIG. 1 in the example of performing activities with respect to cargo handling on a sea-going merchant vessel.

FIG. 5 shows a detection flow procedure 500 in the example of cargo operations for one or more vessels in a fleet. At the computation phase 510, sample detectors 512 can include a pipe connected, a pipe disconnected, a person interacting with equipment, a person standing, arriving or leaving, a person wearing a hard-hat, gloves, goggles and/or other PPE. The data primitives phase 520 provides sample detected metrics 522 include starting and ending time, duration number of personnel participating, a protocol step executed and/or PPE employed in the task(s). Event samples 524 can include a task complete in X minutes, task completion X % larger or shorter than usual, the task performed by X personnel and/or a task performed without (free of) PPE of X type. In the information phase 530 sample reports 532 can include duration over time, participation, protocol compliance, location/log, distribution (e.g. number of drills X duration) and/or non-conformities versus normal/standard operation. These can be presented as vessel reports 534 or fleet reports 536. Sample detected metrics 522 and event samples 524 are reported as discrete events 538 and complex events 539.

Other exemplary detection flows can be provided as appropriate to generate desired information on activities of interest by the ship's personnel and systems. Such detection flows employ relevant detector types, parameters, etc. Likewise, the mechanism to carry out detection can vary. In an alternate arrangement, expressly contemplated herein, event detectors can be partially or fully implemented using appropriate deep learning software algorithms/non-transitory computer-readable program instructions implemented on the shore-based and/or vessel-based processor(s). By way of non-limiting example an implementation of a "hybrid" detector arrangement using deep learning/artificial intelligence is shown and describe in commonly assigned U.S. patent application Ser. No. 17/873,053, entitled SYSTEM AND METHOD FOR AUTOMATIC DETECTION OF VISUAL EVENTS IN TRANSPORTATION ENVIRONMENTS, filed Jul. 25, 2022, the teachings of which are expressly incorporated by reference as useful background information.

IV. Risk Assessment

A. Operational Process

In an illustrative embodiment, the system and method herein allows for assessment of risk a commercial vessel through reaction(s) to automatically detected maritime visual events onboard that commercial vessel. The events are monitored and generated using the above-described arrangement and equivalent implementations thereof. Generated and stored event data is used in real time and near-real time (e.g. with normal system transmission/processing latency), and at subsequent times, to generate risk profiles on vessels and fleets, along with information associated therewith (e.g. insurance rate information, recommended risk mitigation steps, etc.).

Figure 6:
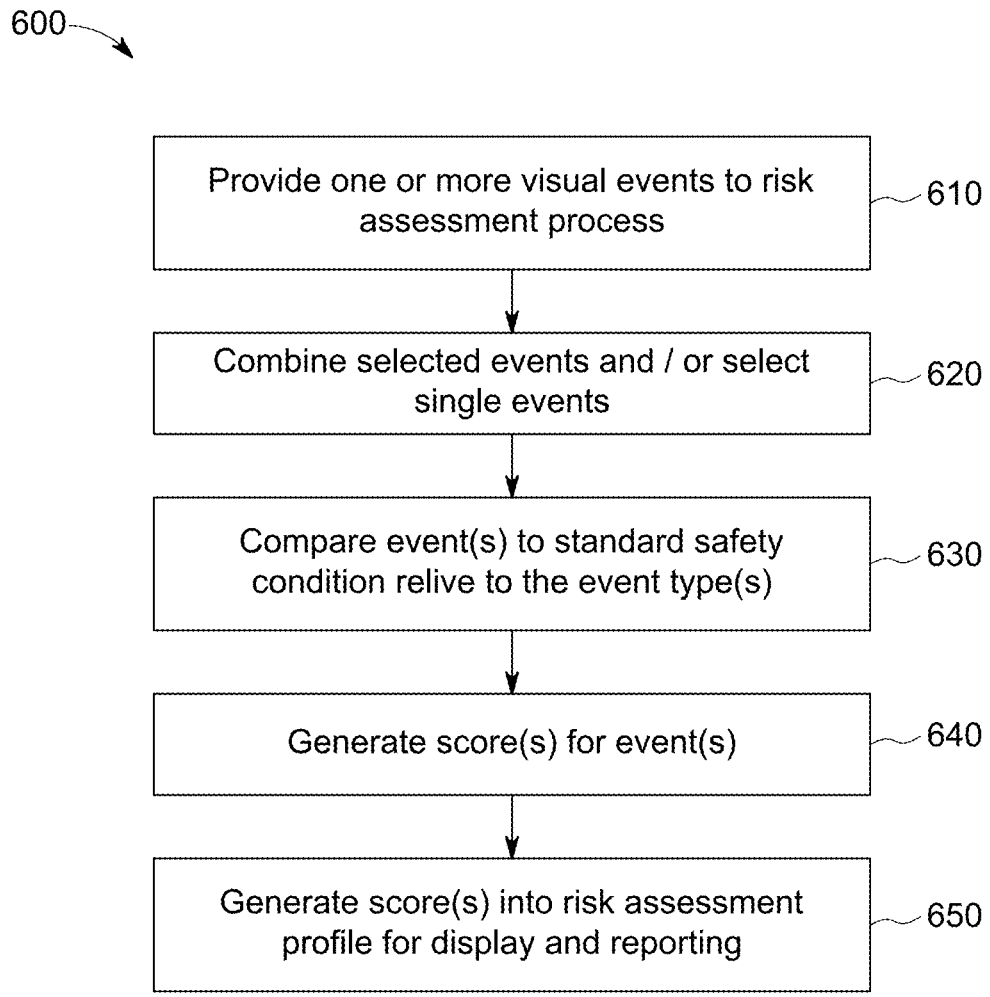
FIG. 6 is a flow diagram showing a generalized procedure for generating risk assessment and reports from events.

With reference again to the system arrangement 100 of FIG. 1, the processing arrangement 150 includes a risk assessment process(or) or module 157 and a risk reporting process(or) or module 158. The actual functions of these modules can be arranged in a variety of ways and instantiated on the shore-based server platform(s) 140, the vessel-based server 130, or both. The processes/ors carry out various functions based upon received event data. With reference to the procedure 600 in FIG. 6 the system provides, in step 610, to the risk assessment process(or), one or more automatically generated events with associated information on automatically detected maritime visual events, which can be characterized by categories of crew behavior/navigation/management, crew safety, ship machinery, maintenance and housekeeping, ship environment and pollution control, and active cargo monitoring. These events can be further categorized as involving hull and machinery, cargo, and personnel. According to step 620, the events can be assessed as single instances, or combined in a time-based (or another baseline) manner.

In step 630, the single or group of aggregated events are compared to examples of safe or unsafe conditions related to the particular event or category of event using appropriate comparison metrics. Comparison can use, for example, conventional deep learning (and/or other artificial intelligence (AI)) techniques in which the visual information in the event is matched to various images of high, low or middle risk scenarios derived from a local or cloud-based data store. These comparisons are then used to provide risk assessment scores (step 640) based upon a scale that can be established for each type of event. The scale can include various factors and be linear or non-linear. For example, in the case of a partial PPE event by crew, failure to wear gloves can establish a minor level of risk assessment score while failure to wear a hard hat can establish a much higher risk assessment score (also termed herein, "risk score"). Note that training of the deep learning/AI system to recognize high, middle and low risk scenarios can be ongoing. When new and/or unique visual events from across a fleet are noted by the user, such can be added to the overall deep learning library of image data using the interface arrangement herein. In this manner the risk assessment profile can be continually refined and improved. Note also that such a library of risk-associated image data and corresponding metrics relating to level/magnitude of risk is denoted in FIG. 1 as Risk Data 159. This data store 159 interacts with the processing arrangement(s)

The determination of risk assessment score can be based upon a variety of techniques that can be applied variously depending upon the type of event or other factor. For example, a score can be computer based upon comparing the acquired visual event to a minimum standard that is associated with a type of vessel or fleet of vessels. Alternatively risk assessment score can be based upon comparing the acquired visual event to a relative standard (a numerical value for a complying or non-complying event) that is associated with a type of vessel or fleet of vessels. In particular, the relative standard can be based upon a predetermined number of standard deviation(s) from a mean value (e.g. a value that deviates more than one standard deviation is non-complying). By way of non-limiting example, if failure to strap down a cargo at one point is detected, a single strap or single instance may generate a first score. That score may be below a standard deviation for non-compliance. If, however multiple instances of a missing strap or a plurality of missing straps in a single instance are detected, such may exceed one standard deviation of non-compliance. Alternatively, an absolute minimum standard can dictate any time two straps are missing it is a non-compliant act, but one missing strap is occasionally permitted.

Then, in step 650, the scores can be aggregated/combined into a risk assessment value. More generally, the risk assessment can be a single score in response to a single detected event or multiple detected events at a single point in time. It can also be a composite or array of scores derived by combining multiple detected events or by looking at overall statistics of single detected events or multiple detected maritime visual events over a length of time.

The system and method allows an automatic risk assessment during active operation of the vessel in addition to representing static condition. For example, in addition to "Do hoses/manifolds/pipelines appear in good condition?" the system and method provides further queries based upon observed conditions, such as, "When hoses/manifolds/pipelines are observed operating, are any leaks visible?" Similarly, non-visual, sensed conditions, such as active operation of pumps, generators, engines, purifiers, etc. can be assessed in addition to apparent static condition. This active assessment can improve the overall assessment of risk when compared with static assessment. These questions involve the broad category of hull and machinery.

The following are examples of dynamic and automatic assessments based on automatic visual events compared with static surveyors, where a static survey can typically generate a defect list that allows the vessel to be mapped as "standard", "below standard" or "above standard." These categories can also map to medium risk, higher risk, and lower risk.

(a) Instead of a static survey question, such as "Are crew members trained to use PPE" and/or "Are PPE available and in good condition", the system and method automatically determines "Are crew members using PPE when in the machinery rooms, steering gear rooms, and on deck? By querying visual events that identify and analyze crew member images and associate these with various vessel locations where the event images are acquired (i.e. camera location).

(b) In addition to a survey question, such as "Are water leak alarms tested", the system and method determines, using images and sensors, "Is water visibly leaking during the voyage."

(c) Instead of a survey question, such as "Are systems in place for regular cleaning/maintenance and keeping appropriate records of cleaning/maintenance", the system and method determines "is regular cleaning/maintenance taking place" during the voyage.

(d) Instead of a static survey question based on a ship's log or documentation, such as "Are safety drills carried out and documented accordingly", the system and method determines that the appropriate safety drills have taken place through visual observation of the safety drills.

(e) Instead of survey question, such as "Are safety procedures in place for working in cold/restricted rooms?" The system and method invention identifies that limits of exposure are met and that proper protective equipment is used. Generally safety questions are in the broad category of personnel.

B. Reporting and Display

Figure 7:
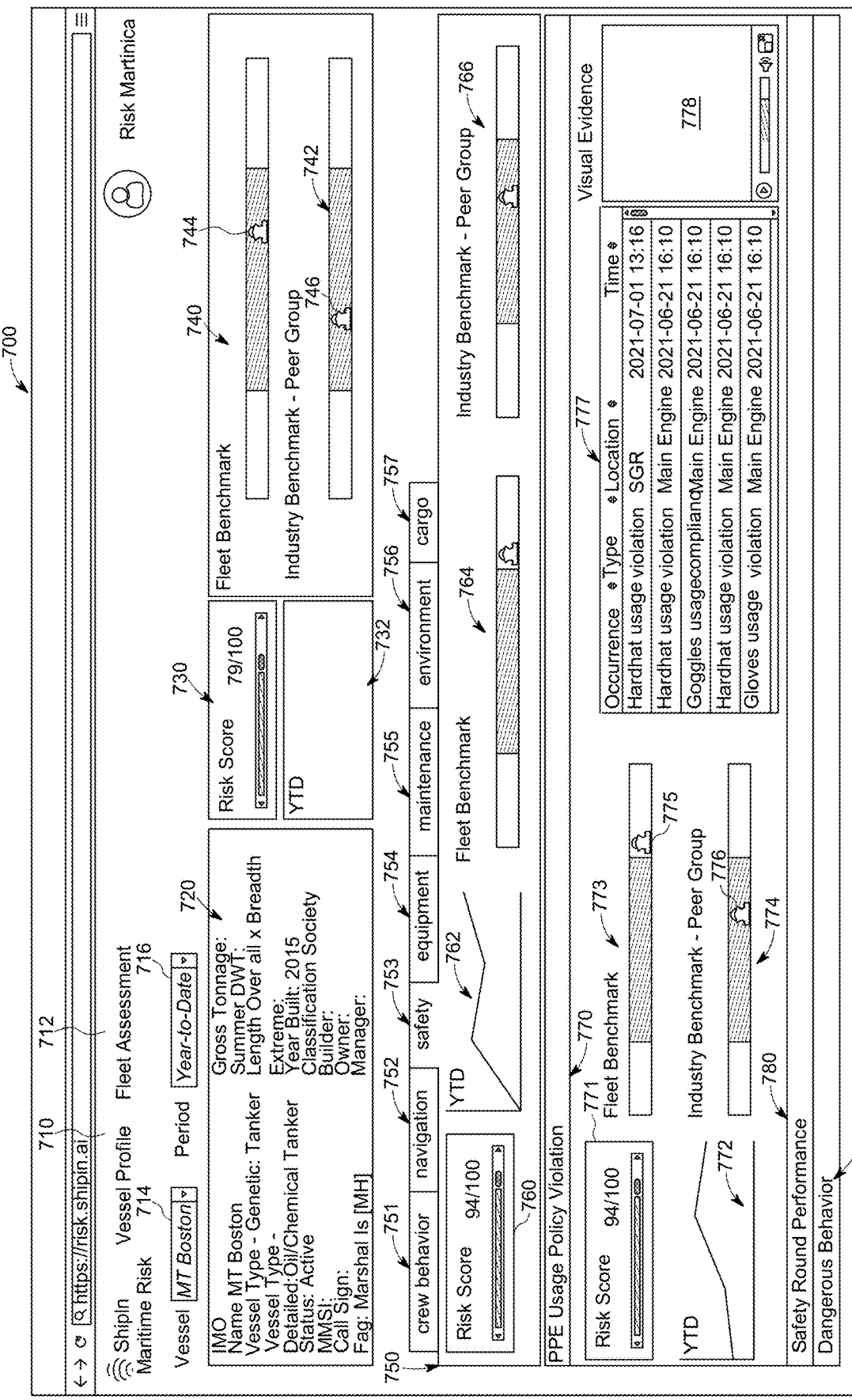
FIG. 7 is a diagram showing an exemplary GUI displayed by a processor and associated process in the system and method of FIG. 1, depicting an exemplary dashboard of vessel risk profile based upon visual events.
Figure 8:
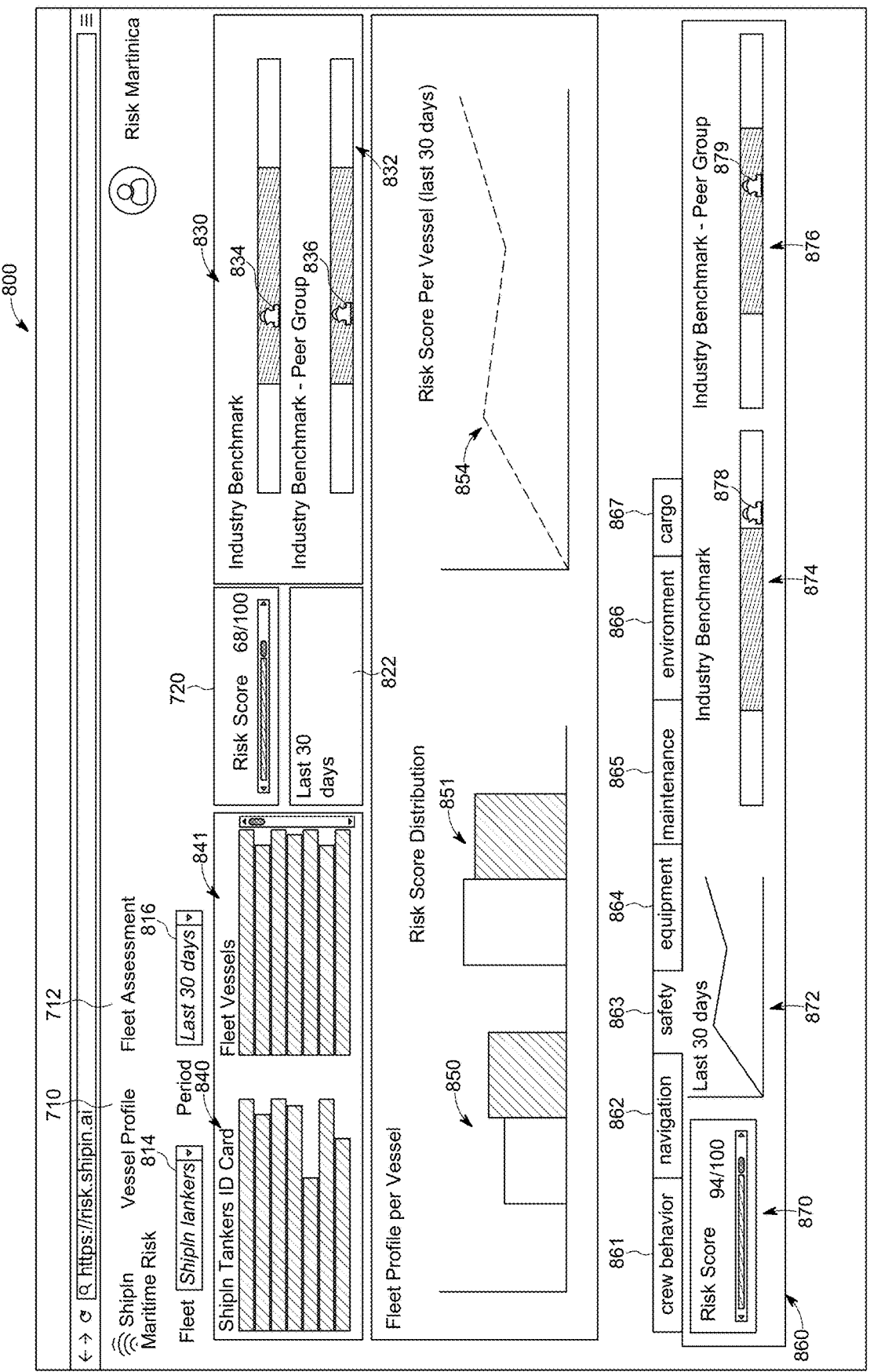
FIG. 8 is a diagram showing an exemplary GUI displayed by a processor and associated process in the system and method of FIG. 1, depicting an exemplary dashboard of fleet risk assessment based upon an aggregation of vessel risk profiles from visual events, as well as fleet and industry risk data.

The risk assessment module 157 derives data on risk for individual vessels and fleets that can be provided to the risk reporting module 158 to enable shore-based and/or vessel-based display of relevant information on an appropriate graphical user interface (GUI) screen instantiated on (e.g.) a conventional web browser based computing platform (e.g. displays 134, 172), or another custom computing device. The platform provides a variety of interface screens for reporting and manipulating event data, as described generally in above-incorporated U.S. patent application Ser. No. 17/175,364. FIGS. 7 and 8 show exemplary GUI displays 700 and 800 that relate directly to reporting and manipulating of vessel risk profile and fleet risk assessment, respectively. Both displays 700, 800 can be selected via an appropriate tab on a main interface screen or other menu-based arrangement.

As shown in FIG. 7, the display 700 is selected from a vessel risk profile tab 710, which is displayed aside a vessel risk assessment selection tab 712, used to access the display 800 described further below. The vessel risk profile display 700 includes a dropdown menu 714 for selecting a vessel in the fleet. A second dropdown menu 716 allows selection of the time period for which the selected vessel's risk profile is sought—in this example year to date. Other time periods/intervals, which should be clear to those of skill can be selected—such as current or previous quarter, current or previous month, last year, custom date range, etc. The selection of a vessel and time period causes its relevant identifying data to be displayed in the window 720, and causes the process(or) to compute the overall risk score 730 for that vessel within the applicable period. The displayed overall vessel risk score can be based upon (e.g.) a weighted combination of individual risk scores during the period based upon events and other sensed conditions described above. In this example, the overall vessel risk score is based upon a 100 scale, but other numerical and/or graphical metrics can be employed. A graph 732 of overall vessel risk score over time is also provided for the selected time period/interval. Notably, the system accesses available data on the industry and relative peer group (for example, tankers operating in the same route and/or those in the same fleet) to provide benchmarks for the vessel's risk profile. The fleet benchmark 740 and the industry peer group bench mark 742 are each shown as a slide scale with an indicia 744 and 746, respectively for the vessel in question.

A pane 750 containing a plurality of side-by-side tabs allows various categories/types of analyzed risk to be analyzed in greater detail by the user. The exemplary categories depicted in the pane 750 include crew behavior 751, navigation 752, safety 753, equipment 754, maintenance 755, environment 756 and cargo 757. The number and types of categories can be varied based upon the type of vessel, its mission, and/or industry standards for risk assessment. In this example, the safety tab 753 is opened, revealing a current safety risk score 760 and associated risk score graph 762 over the selected time period. Slide scales for fleet benchmark 764 and industry peer group benchmark 766 in the safety category are also shown. More particular information used to make up the risk score in the category is displayed in a set of lower, selectable panes 770, 780 and 790. The number of panes in this area corresponds to the types of events being monitored for the risk category. In this safety example, the types include PPE Usage Policy Violations (pane 770, which is open and displayed in the depicted example), Safety Round Performance (pane 780) and Dangerous Behavior by crew (pane 790). Each pane can contain information unique to the type of events monitored. In general, the information is similar to that of the displayed safety pane 770. The information includes a risk score 771 and graph of score over the time period 772. It also includes slide scales 773 and 774 with fleet and industry peer group benchmarks with the vessels relative location 775 and 776 along the benchmark scale, respectively shown. A scrolling listing 777 of all violations (and compliant) events is depicted. This listing includes the (a) type of event (e.g. hardhat usage, goggle usage, etc.), (b) the status (e.g. compliance, violation, etc.), (c) the location on the vessel, which typically corresponds to one or more cameras/sensors, and (d) a timestamp. By clicking on the entry in the listing with (e.g.) a cursor or screen touch, the user can view a video clip of the event in a viewing window 778 with appropriate playback controls including audio where applicable.

As shown in FIG. 8, the fleet risk assessment display 800 is accessed via the assessment selection tab 712 described above. This display allows the user to review data associated with all vessels in a fleet, aggregated together to provide an overall fleet risk assessment. The fleet risk assessment display 800 shows a dropdown menu 814 to select a fleet of vessels and the period of time 816 for which a risk assessment is desired. Overall risk score (in this example on a 100 scale) 820 is shown for the present day and a graph 822 of risk score over the selected time period is also shown. The system accesses available data on the industry and industry's relative peer group (for example, tankers operating in the same route) to provide benchmarks for the fleet's risk. The industry benchmark 830 and the peer group bench mark 832 are each shown as a slide scale with an indicia 834 and 836, respectively for the fleet in question. An ID list 840 and vessel list 841 are provided to indicate vessels currently in the fleet being assessed. Bar graphs 850 and 851 show a fleet risk profile per vessel (two bars shown for two exemplary vessels) and risk score distribution, respectively. A graph 854 showing risk score over the time period is also displayed. In embodiments, clicking or touching various vessel-specific information can bring up the display 700 for that vessel's profile and/or other vessel-specific information.

A pane 860 containing a plurality of side-by-side tabs allows various categories/types of analyzed risk to be analyzed relative to the fleet in greater detail by the user. The exemplary categories depicted in the pane 860 include crew behavior 861, navigation 862, safety 863, equipment 864, maintenance 865, environment 866 and cargo 867. The number and types of categories can be varied based upon the type(s) of vessel in the fleet, their mission, and/or industry standards for risk assessment. In this example, the safety tab 863 is again opened, revealing a current fleet safety risk score 870 and associated risk score graph 872 over the selected time period. Slide scales for industry safety benchmark 874 and industry peer group benchmark 876 in the safety category are also shown. The fleet's position within each benchmark scale 874 and 876 is shown by respective indica 878 and 879.

V. Conclusion

It should be clear that the above-described system and method provides an effective and useful tool for assigning and handling risk to various automatically detected visual events. It effectively replaces and supersedes and/or improves upon the existing static methods of manual (and even paper-based) condition surveys at a single point in time, where such surveys are often performed by a surveyor or inspector. Since the risk assessment takes place automatically without the need for a paid surveyor or inspector, the assessment may cost less than previous manual assessments or may allow for briefer manual assessments. This system and method provides further advantages relative to a paid surveyor or inspector in that a paid surveyor or inspector produces highly variable assessments that depend on the highly variable level of skills possessed by that surveyor or inspector. Conversely, the system and method produces direct observations of condition which are substantially more repeatable than manual surveys.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein, the terms "process" and/or "processor" should be taken broadly to include a variety of electronic hardware and/or software-based functions and components (and can alternatively be termed functional "modules" or "elements"). Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Additionally, as used herein various directional and dispositional terms such as "vertical", "horizontal", "up", "down", "bottom", "top", "side", "front", "rear", "left", "right", and the like, are used only as relative conventions and not as absolute directions/dispositions with respect to a fixed coordinate space, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances of the system (e.g. 1-5 percent). Accordingly, this description is meant to be taken only by way of example, and not to otherwise limit the scope of this invention.

What is claimed is:

1. A method for assessing maritime vessel risk in response to automatically detected maritime-based visual events comprising the steps of:
   detecting a portion of an image that indicates at least one maritime visual event of a plurality of maritime-based visual events for which image data is acquired by at least one commercial ship-mounted camera, the image data comprising at least a portion of a hull, a bridge, steering gear room, machinery room, deck, or cargo-handling machinery of the commercial ship;
   providing the image data of the at least one maritime visual event to a processor that configures the at least one maritime visual event with a set of visual event metrics that correspond to a type of the at least one maritime visual event determined from the image data based at least in part on the at least one portion of the hull of the commercial ship, the bridge of the commercial ship, steering gear room of the commercial ship, machinery room of the commercial ship, deck of the commercial ship, or the cargo-handling machinery of the commercial ship, wherein the type of the at least one maritime visual event is associated with at least one of, safety, security, maintenance, crew behavior, and cargo;
   producing a risk assessment score from the at least one maritime visual event based at least in part on a risk profile that reflects a maritime visual event type-specific scale of risk assessment that is established for each type of visual event based on factors derived from the portion of the image data that characterize each type of maritime visual event;
   wherein producing the risk assessment score includes applying one of a variety of risk assessment score generation techniques, the one of the variety of risk assessment score generation techniques selected based on the type of the at least maritime visual event; and
   providing the risk assessment score to a user in a desired format.

2. The method as set forth in claim 1 wherein the step of producing the risk assessment score includes comparing the at least one visual event to data of complying or non-complying model visual events from a data storage, and establishing a score based upon a level of conformity between the at least one visual event and the complying or non-complying model visual events.

3. The method as set forth in claim 2 wherein the risks relate to at least one of (a) machinery maintenance alerts, (b) cargo conditions or operations, and (c) personnel safety, security and crew behavior.

4. The method as set forth in claim 2 wherein the step of producing the risk assessment score includes comparing the at least one visual event to a minimum standard that is associated with at least one of (a) a type of vessel or fleet of vessels, (b) cargo handling standards, and (c) safety standards.

5. The method as set forth in claim 1 wherein the risk profile for the type of the at least one maritime visual event is based on a relative standard that is associated with at least one of (a) a type of vessel or fleet of vessels, (b) cargo handling standards, and (c) safety standards.

6. The method as set forth in claim 5 wherein the relative standard is established based upon the type of the at least one maritime visual event.

7. The method as set forth in claim 1, further comprising, providing additional information to the user in association with the risk assessment score, wherein the additional information is consistent with that provided in a static vessel risk survey.

8. The method as set forth in claim 1, further comprising, detecting a plurality of maritime-based visual events acquired by cameras aboard each of a plurality vessels in a fleet that each provides image data of the plurality of visual events, the plurality of visual events being associated with at least one of, safety, security, maintenance, crew behavior, and cargo, producing risk assessment scores in response to the detected visual events, and correlating the risk assessment scores into an overall risk assessment of the fleet.

9. The method as set forth in claim 8 wherein the risk assessment is organized into at least one of safety, security, maintenance, crew behavior, and cargo and is displayed on a user interface.

10. The method as set forth in claim 9 wherein a profile of the risk assessment for an individual vessel in the fleet is displayed on the user interface based upon a user selection thereof.

11. The method as set forth in claim 1, wherein detecting the at least one maritime visual event includes event priority sequencing, filtering via at least one of cropping or compression, and qualifying of events based upon rules to provide pattern matches according to a time series of events.

12. A system for assessing maritime vessel risk in response to automatically detected maritime-based visual events, the system comprising:
   a commercial ship-mounted camera arranged to acquire and detect a portion of an image indicative of at least one maritime visual event aboard a commercial ship, the image comprising at least a portion of a hull, a bridge, a bridge, steering gear room, machinery room, deck, or cargo-handling machinery of the commercial ship;
   a maritime visual event configuration system arranged to configure the at least one maritime visual event with a set of visual event metrics that correspond to a type of the at least one maritime visual event determined from the image based at least in part on the at least one portion of the hull of the commercial ship, the bridge of the commercial ship, a bridge of the commercial ship, steering gear room of the commercial ship, machinery room of the commercial ship, deck of the commercial ship, or the cargo-handling machinery of the commercial ship, wherein the type of the at least one maritime visual event is associated with at least one of, safety, security, maintenance, crew behavior, and cargo, and to provide image data of the visual event;

a processor, receiving the image and data of the configured maritime visual event and producing a risk assessment score from the at least one maritime visual event based at least in part on a risk profile that reflects a maritime visual event type-specific scale of risk assessment that is established for each type of maritime visual event based on factors derived from the portion of the image data that characterize each type of maritime visual event;

wherein producing the risk assessment score includes applying one of a variety of risk assessment score generation techniques, the one of the variety of risk assessment score generation techniques selected based on the type of the at least maritime visual event; and a user interface that displays information related to the risk assessment score to a user in a desired format.

13. The system as set forth in claim 12, further comprising, a comparison process that compares the at least one visual event to data of complying or non-complying model visual events from a data storage, and establishing a score based upon a level of conformity between the at least one visual event and the complying or non-complying model visual events.

14. The system as set forth in claim 13 wherein the risks relate to at least one of (a) machinery maintenance alerts, (b) cargo conditions or operations, and (c) personnel safety, security and crew behavior.

15. The system as set forth in claim 13 wherein the risk assessment score is based upon a comparison, by the comparison process, of the at least one visual event to a minimum standard that is associated with at least one of (a) a type of vessel or fleet of vessels, (b) cargo handling standards, and (c) safety standards.

16. The system as set forth in claim 13 wherein the risk assessment score is based upon a comparison, by the comparison process, of the at least one visual event to a relative standard that is associated with at least one of (a) a type of vessel or fleet of vessels, (b) cargo handling standards, and (c) safety standards.

17. The system as set forth in claim 16 wherein the relative standard is based upon a predetermined number of standard deviation(s) from a mean value.

18. The system as set forth in claim 12, further comprising, additional information provided to the user in association with the risk assessment score, wherein the additional information is consistent with that provided in a static vessel risk survey.

19. The system as set forth in claim 12, further comprising, a plurality of cameras aboard each of a plurality vessels in a fleet that each provides image data of the plurality of visual events, the plurality of visual events being associated with at least one of, safety, security, maintenance, crew behavior, and cargo, producing risk assessment scores in response to the detected visual events, and correlating the risk assessment scores into an overall risk assessment of the fleet.

20. The system as set forth in claim 19, further comprising a user interface containing the risk assessment in which the risk assessment is displayed according to categories including at least, one of safety, security, maintenance, crew behavior, and cargo.

21. The system as set forth in claim 20, wherein the user interface displays a profile of the risk assessment for an individual vessel in the fleet, and including a selector on the user interface for selecting the individual vessel.

* * * * *